United States Patent
Saito et al.

(10) Patent No.: US 11,074,626 B2
(45) Date of Patent: Jul. 27, 2021

(54) METHOD, SERVER, AND PROGRAM FOR MANAGING APPLICATION

(71) Applicant: GREE, INC., Tokyo (JP)

(72) Inventors: Kota Saito, Tokyo (JP); Keisuke Murata, Tokyo (JP)

(73) Assignee: GREE, INC., Tokyo (JP)

(*) Notice: Subject to any disclaimer, the term of this patent is extended or adjusted under 35 U.S.C. 154(b) by 1372 days.

(21) Appl. No.: 14/495,535

(22) Filed: Sep. 24, 2014

(65) Prior Publication Data
US 2015/0095135 A1    Apr. 2, 2015

(30) Foreign Application Priority Data
Sep. 27, 2013 (JP) .............................. JP2013-201852

(51) Int. Cl.
*G06Q 30/00* (2012.01)
*G06Q 30/02* (2012.01)
*G06Q 50/00* (2012.01)

(52) U.S. Cl.
CPC ......... *G06Q 30/0277* (2013.01); *G06Q 50/01* (2013.01)

(58) Field of Classification Search
CPC .......................... G06Q 30/0277; G06Q 50/01
USPC ...................................................... 705/14.39
See application file for complete search history.

(56) References Cited

U.S. PATENT DOCUMENTS

| 8,874,466 B2* | 10/2014 | Bethke | H04L 67/38 |
| | | | 705/14.12 |
| 2010/0100446 A1 | 4/2010 | Kim | |
| 2011/0212762 A1* | 9/2011 | Ocko | A63F 13/85 |
| | | | 463/25 |
| 2013/0151342 A1* | 6/2013 | Citron | A63F 13/537 |
| | | | 705/14.64 |

FOREIGN PATENT DOCUMENTS

| JP | 2005-27853 | 2/2005 |
| JP | 2005103265 | 4/2005 |
| JP | 2008295775 | 12/2008 |

(Continued)

OTHER PUBLICATIONS

Linner, IEEE Computer Society, 2005.*
(Continued)

*Primary Examiner* — Azam A Ansari
*Assistant Examiner* — Michael I Ezewoko
(74) *Attorney, Agent, or Firm* — Oblon, McClelland, Maier & Neustadt, L.L.P.

(57) ABSTRACT

When detecting selection of a source application stored in a storage section in a user device, a controller outputs to the user device an advertisement link related to a destination application associated with the source. When the advertisement link is selected in the user device, the controller guides the user device to the destination application. The controller acquires completion state information on a mission in the destination application associated with the user ID of the user of the user device, and stores the completion state information in the storage section. When the completion (Continued)

state information meets a predetermined condition, the controller provides the completion state information to the source application in order to give an incentive to the user in the source application.

13 Claims, 7 Drawing Sheets

(56) References Cited

FOREIGN PATENT DOCUMENTS

| JP | 2010-521734 | 6/2010 |
|----|----|----|
| JP | 2011500277 | 1/2011 |
| JP | 2013101476 | 5/2013 |
| JP | 2013128781 | 7/2013 |
| WO | WO2009055358 | 4/2009 |
| WO | WO 2012/177951 A1 | 12/2012 |
| WO | WO 2013/136946 A1 | 9/2013 |

OTHER PUBLICATIONS

"Weekly FAMITSU Apr. 22, 2010", Enterbrain, Inc., Apr. 8, 2010, vol. 25. No. 16, p. 51. English Translation not available.
Office Action dated Jul. 1, 2019, in corresponding Japanese Patent Application No. 2018-145594 (with English-language translation).
Office Action dated Dec. 17, 2013 in Japanese Patent Application No. 2013-201852 (with English-language translation); 7 pages.
Office Action dated May 7, 2014 in Japanese Patent Application No. 2013-201852 (with English-language translation); 6 pages.
Office Action dated Feb. 17, 2015 in Japanese Patent Application No. 2014-219211 (with English-language translation); 7 pages.
"No-en Hokkorina (Relief on Farm)"; Famitsu mobage No. 3, Weekly Famitsu Jan. 12, 2012 special issue, Enterbrain, Inc., Dec. 15, 2011, (with English translation); 7 pages.
Office Action dated Oct. 6, 2015 in Japanese Patent Application No. 2015-141498 (with English-language translation); 7 pages.
Office Action dated Jan. 11, 2017 in Japanese Patent Application No. 2016-044559 (with English-language translation): 8 pages.
Office Action dated Jul. 2, 2019 in Japanese Patent Application No. 2018-145594 (with English-language translation); 6 pages.
Office Action dated Mar. 30, 2021 in Japan Patent Application No. 2020-031420 (with English translation); 6 pgs.

* cited by examiner

METHOD, SERVER, AND PROGRAM FOR MANAGING APPLICATION

RELATED APPLICATIONS

This application claims benefit of priority of Japanese Application No. 2013-201852, filed Sep. 27, 2013, said application being hereby fully incorporated herein by reference.

FIELD OF THE INVENTION

The present invention relates to a method, a server, and a program for managing applications by guiding a user of one application to another application.

BACKGROUND OF THE INVENTION

In recent years, various games have been provided via networks. For example, social network games are provided on social networking services (SNS).

Techniques for preventing reduction in users' incentives to continue such games have been sought. For example, see Japanese Laid-Open Patent Publication No. 2013-128781 Publication. The server device described in the document governs a game while making communication with a user device. When a first event occurs while a game is being played, the server device decreases a parameter value for the game and creates corresponding first display data. Further, the server device counts the number of times of the first event, and sets a probability that a second event occurs based on the number of times of the first event and the parameter value. The server device determines whether to generate the second event based on the set probability. When determining to generate the second event, the server device decreases the parameter value for the game, creates corresponding second display data, and transmits the first display data and the second display data to the device.

Also, techniques for enabling access to a website related to an object in a game. For example, see Japanese Laid-Open Patent Publication No. 2008-295775 Publication. The online game server described in the document displays objects that can be selected by a player on the game display view of an online game played in a player's device. When the player selects an object, the server transmits information for accessing the website related to the selected object in addition to information required for playing the game to the player's device. When the player accesses the website via the player's device, the server displays an advertisement view by the website related to the object on the display view of the player's device.

Further, cross promotions are performed in promotion activities for products and services in some cases. A good client for one company's products or services is provided with another company's products or services as a reward in cross promotion.

A great number of applications provided on the Internet are often independently managed. For example, when applications are provided by different providers, each provider cannot grasp the states of applications managed by other providers.

In cross promotion using applications, one application guides its clients to other applications. If only the destination application is vitalized, the client guiding activity cannot be vitalized. Vitalization of the source application also needs to be taken into consideration.

SUMMARY OF THE INVENTION

It is an objective of embodiments of the present invention to provide a method, a server, and a program for managing applications by efficiently guiding a user of one application to another application.

To achieve the foregoing objective and in accordance with one aspect of the present invention, a method for managing applications is provided. The method includes using a controller to: when detecting selection of a source application stored in a storage section in a user device, output to the user device an advertisement link related to a destination application associated with the source; when the advertisement link is selected in the user device, guide the user device to the destination application; acquire completion state information on a mission in the destination application associated with a user ID of a user of the user device and store the completion state information in the storage section; and when the completion state information meets a predetermined condition, provide the completion state information to the source application in order to give an incentive to the user for the source application.

In accordance with another aspect of the present invention, a server for managing applications is provided. The server includes a storage section and a controller. The storage section stores information associating a source application with a destination application and completion state information on at least one mission associated with user IDs of participants. The controller is connected to a user device via a network. When detecting selection of a source application stored in the storage section in the user device, the controller outputs to the user device an advertisement link related to a destination application associated with the source. When the advertisement link is selected in the user device, the controller guides the user device to the destination application. The controller acquires completion state information on a mission in the destination application associated with the user ID of the user of the user device and stores the completion state information in the storage section. When the completion state information meets a predetermined condition, the controller provides the completion state information stored in the storage section to the source application in order to give an incentive to the user in the source application.

In accordance with a further aspect of the present invention, a non-transitory computer readable medium for storing a program for executing a method for managing applications by using a storage section for storing information associating applications at a source and a destination and completion state information on at least one mission in association with user IDs of participants, and a controller connected to a user device via a network. When detecting selection of a source application stored in the storage section in the user device, the controller outputs to the user device an advertisement link related to a destination application associated with the source. When the advertisement link is selected in the user device, the controller guides the user device to the destination application. The controller acquires completion state information on a mission in the destination application associated with the user ID of the user of the user device and stores the completion state information in the storage section. When the completion state information meets a predetermined condition, the controller provides the completion state information to the source application in order to give an incentive to the user in the source application.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4(a) is an explanatory diagram of campaign display on a source application view, FIG. 4(b) is an explanatory diagram of a game on a destination application view, FIG. 4(c) is an explanatory diagram of mission completion on the destination application view, FIG. 4(d) is an explanatory diagram of mission check on the source application view, and FIG. 4(e) is an explanatory diagram of incentive acquisition on the source application view;

DETAILED DESCRIPTION OF THE PREFERRED EMBODIMENTS

An application management method according to one embodiment will be described below with reference to FIGS. 1 to 5. In the present embodiment, it is assumed that cross promotion is conducted on a user using a plurality of applications (such as games).

Figure 1:
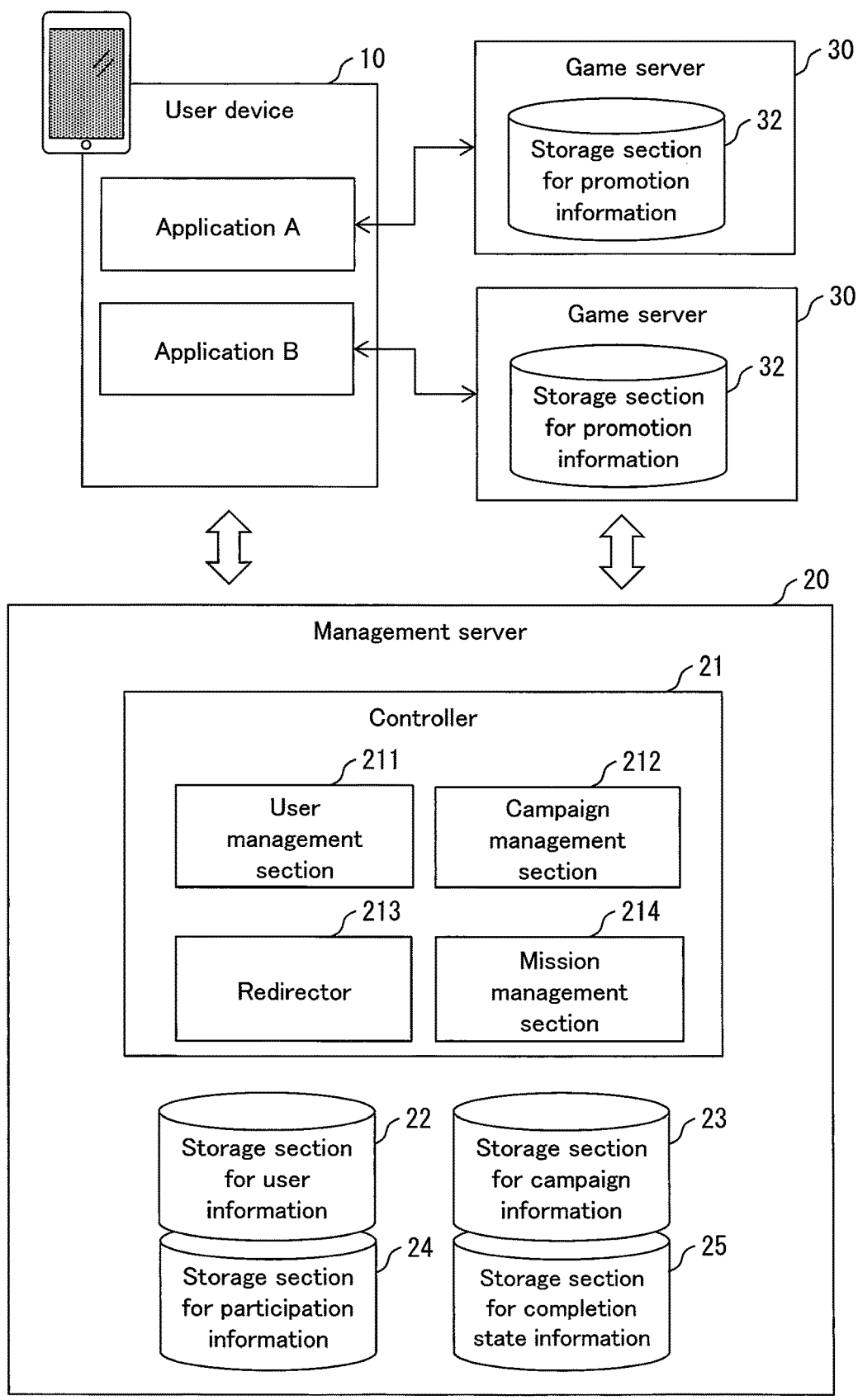
FIG. 1 is a schematic diagram of a system according to one embodiment.

As illustrated in FIG. 1, in the present embodiment, a user device 10, a management server 20, and a plurality of game servers 30 are used. The user device 10, the management server 20, and the game servers 30 are connected via a network such as the Internet.

The user device 10 is a computer device (information processing device such as a smartphone) of a registered user. The user can participate in games provided by the game servers 30 by use of the user device 10. The user can manage a local calendar on the user device 10 or participate in various SNSs (social networking services) by use of the user device 10. The present embodiment assumes that the user uses games and applications A and B associated with the games by use of the user device 10.

The management server 20 is a computer system for managing the user of the user device 10 using a plurality of applications. Specifically, the management server 20 functions as an infrastructure system (platform) for organizing the users of the user devices 10 and managing game services provided by various game servers 30. The management server 20 includes a controller 21 having a CPU, a RAM, a ROM and the like, a storage section for user information 22, a storage section for campaign information 23, a storage section for participation information 24, and a storage section for completion state information 25.

The controller 21 functions as a user management section 211, a campaign management section 212, a redirector 213, and a mission management section 214 by executing management programs. The user management section 211 manages the users using various applications. The campaign management section 212 manages campaigns for cross promotion. The redirector 213 reconnects (redirects) the user device 10 connected to a game server 30 providing a source application to a game server 30 providing a destination application. The mission management section 214 manages mission completion states of games.

The storage section for user information 22 stores user management information for authenticating the users and for managing the games used by the users. The storage section for user information 22 stores the user management information at the time of user registration in the platform, and updates it at the time of game use registration. The user management information includes data on a user ID, a login password, and the currently-used game.

The user ID data area records data on identifiers for identifying each user. The login password data area records data for user authentication when the user logs in the management server 20. The currently-used game data area records data on identifiers (game IDs) for identifying the game being used by the user.

The storage section for campaign information 23 stores campaign management information for managing campaigns for cross promotion and mission management information on mission-based completion conditions. The campaign management information and the mission management information are registered when cross promotion is conducted. The campaign management information includes data on campaigns ID, sources, destinations, missions, incentive, and campaign periods. The campaign ID data area records data on identifiers for identifying campaigns for cross promotion. The present embodiment assumes a campaign that guides clients from a predetermined source (such as application A) to a predetermined destination (such as application B).

The source data area records data on identifiers (game IDs) for identifying a source application of the campaign. The destination data area records data on identifiers (game IDs) for identifying a destination application of the campaign. The mission data area records data on identifiers (mission IDs) for identifying a mission that should be completed by a user to acquire an incentive. The incentive data area records data on benefits (incentives) provided to users who have completed missions. The campaign period data area records data on execution periods of campaigns. The mission management information includes data on mission ID, mission contents, and completion conditions.

The mission ID data area records data on identifiers for identifying each mission.

The mission contents data area records data on contents of the missions. In the present embodiment, the missions are "install application", "log in for predetermined period (such as 2 days)", "invite a friend", "complete predetermined stage", and the like.

The completion condition data area records data on conditions for completing the missions. Exemplary completion conditions include "completable only once", "completable predetermined number of times in predetermined period (such as 1 day)", "completable unlimitedly", and the like.

The storage section for participation information 24 stores participation management information for managing a participation state in a campaign of each user. The storage section for participation information 24 records participation management information when a user wants to participate in a campaign. The participation information includes data on user ID and campaign ID. The user ID data area records data on identifiers for identifying a user who wants to participate in each campaign. The campaign ID data area records data on identifiers for identifying a campaign in which each user wants to participate.

The storage section for completion state information 25 records completion management information for managing a mission completion state of each user. The storage section for completion state information 25 registers the completion management information when acquiring a mission progress state from a game server 30 for managing each application. The completion management information includes data on user ID, campaign ID, and mission ID.

The user ID data area records data on identifiers for identifying users who are participating in each campaign. The campaign ID data area records data on identifiers for identifying a campaign in which each user is participating. The mission ID data area records data on identifiers for identifying a mission that has been completed by each user in each campaign.

The game server 30 is a server computer for providing various applications (games, herein) on the Internet. According to the present embodiment, each game server 30 is managed by an independent application provider and provides applications (games) to the user device 10. Further, the game server 30 organizes and manages cross promotion for promoting other games to be used by each game for a plurality of games. The game server 30 comprises a storage section for promotion information 32 for managing cross promotion for users.

The storage section for promotion information 32 records promotion management information for missions and incentives provided in cross promotion. The storage section for promotion information 32 registers the promotion management information when an application provider determines to perform cross promotion. The promotion management information records data on campaign ID, mission ID, mission contents, completion conditions, and incentives.

The campaign ID data area records data on identifiers for identifying a campaign associated with the game server 30. The mission ID data area records data on identifiers for identifying a mission that should be completed by a user to acquire an incentive at the destination (application).

The mission contents data area records data on contents of each mission. The completion condition data area records data on conditions for completing missions at the destination. The incentive data area records data on benefits (incentives) provided to users who have completed a mission at the source (application).

Each process in the application management method will be described below with reference to FIGS. 2 to 5. First, an application management process will be described with reference to FIG. 2.

The user device 10 performs a login process (step S1-1). Specifically, when playing a game, the user accesses the management server 20 by use of the user device 10. In this case, the user management section 211 in the controller 21 in the management server 20 outputs a login view on the display of the user device 10. The user inputs the user ID and the login password on the login view.

The controller 21 then performs a user authenticating process (step S1-2). Specifically, the user management section 211 acquires the user ID and the login password input on the login view of the user device 10. When the user ID and the login password acquired from the user device 10 are registered in the storage section for user information 22, the user management section 211 successfully performs the login authentication, and completes the login process. On the completion of the login authentication, the user ID of the logged-in user is identified.

The user device 10 then performs an application selecting process (step S1-3). Specifically, the user device 10 outputs a selection view displaying a list of games used by the logged-in users on the display. It is assumed that the user selects the application A as a game. The user device 10 transmits application selection information indicating the selected application to the management server 20. The application selection information includes data on game ID (GAME-1, herein).

The controller 21 then performs a determining process as to whether the user of the user device 10 is qualified to participate in a campaign (step S1-4). Specifically, the campaign management section 212 in the controller 21 checks whether the storage section for campaign information 23 stores the campaign management information recording the game ID (GAME-1) in the source data area. Herein, the campaign management information for which a current time/date is in the campaign period is employed. Thereby, the campaign management section 212 determines whether the game selected by the user of the user device 10 is for the campaign at the source. When the storage section for campaign information 23 stores the campaign management information recording the game ID in the source data area, the selected game is determined as being for the source.

When determining that the selected game is for the source application, the campaign management section 212 identifies the game ID (GAME-2) recorded in the destination data area of the campaign management information. The campaign management section 212 then checks whether the storage section for user information 22 stores the user management information of the logged-in user for which the game ID of the destination application is registered as a currently-used game. Thereby, the campaign management section 212 determines whether the logged-in user is using the destination application.

If the game ID (GAME-2) of the destination application is registered as a currently-used game and the user of the user device 10 is already using the destination application according to the user management information of the user of the user device 10, the controller 21 determines that the user of the user device 10 is not qualified to participate in the campaign. In this case, the effects of guiding clients are not expected, and thus the client guiding to the destination application is restricted. In contrast, if the game ID (GAME-2) of the destination application is not registered as a currently-used game and the user of the user device 10 is not using the destination application, the controller 21 determines that the user of the user device 10 is qualified to participate in the campaign. When determining that the user of the user device 10 is not qualified to participate in the campaign ("NO" in step S1-4), the controller 21 performs a login notifying process (step S1-5). Specifically, the user management section 211 notifies the log-in to the game server 30 of the application A.

In this case, the game server 30 of the application A performs a game view providing process (step S1-6). Specifically, the game server 30 of the application A transmits the game view to the display of the user device 10.

The user device 10 performs a game view displaying process (step S1-7). Specifically, the user device 10 outputs the game view of the application A on the display. When the user plays the game by use of the game view, the game server 30 of the application A performs a game progress management process for the logged-in users (step S1-8).

In contrast, when the controller 21 determines that the user of the user device 10 is qualified to participate in the campaign ("YES" in step S1-4), the controller 21 performs a campaign notifying process (step S1-9). Specifically, the campaign management section 212 transmits the campaign qualification notification to the game server 30 of the application A. The campaign qualification notification includes data on the campaign ID registered in the campaign management information in the storage section for campaign information 23.

In this case, the game server 30 of the application A performs a campaign banner generating process (step S1-10). Specifically, the game server 30 of the application A extracts the promotion management information recording the campaign ID included in the campaign qualification notification from the storage section for promotion information 32. That is, the game server 30 of the application A reads the promotion management information associated with the campaign ID from the storage section for promotion information 32. The game server 30 generates a campaign banner including the information recorded in the read promotion management information. The campaign banner includes data on the link to the management server 20 and the campaign ID.

The user device 10 then performs a banner-including game view displaying process (step S1-11). Specifically, the game server 30 of the application A includes the campaign banner in the game view and transmits the game view to the user device 10. The user device 10 outputs the game view including the campaign banner on the display.

In this case, as illustrated in FIG. 4(a), a source application view 500 is output on the display of the user device 10. The source application view 500 includes a campaign outline display 501, a mission explanation display 502, and a campaign banner 503 as an advertisement link. The campaign outline display 501 includes the gist explanation of the campaign. The mission explanation display 502 includes a mission completing method and completion conditions. The campaign banner 503 includes data on the link to the management server 20 and the campaign ID.

When the user plays the game by use of the game view output on the display of the user device 10 through the banner-including game view displaying process (step S1-11), the game server 30 of the application A performs the game progress management process on the logged-in users (step S1-8).

In contrast, when using the campaign, the user selects the campaign banner displayed on the display of the user device 10. In this case, the user device 10 performs a banner selecting process (step S1-12). Specifically, the user device 10 transmits a campaign selection notification to the management server 20. The campaign selection notification includes data on the campaign ID.

The controller 21 then performs a destination information transmitting process (step S1-13). Specifically, the redirector 213 in the controller 21 transmits the destination information including the redirect URL for accessing the application B to the user device 10.

Further, the controller 21 performs a participation registering process (step S1-14). Specifically, the campaign management section 212 generates participation state management information associating the user ID of the logged-in user with the campaign ID, and records it in the storage section for participation information 24. If the participation state management information associating the user ID with the campaign ID is already recorded in the storage section for participation information 24, this process is skipped.

The user device 10 then performs a redirecting process (step S1-15). Specifically, the user device 10 accesses the game server 30 of the destination application B by use of the redirect URL acquired from the management server 20.

In this case, as illustrated in FIG. 4(b), a destination application view 510 is output on the display of the user device 10. The destination application view 510 includes a game view 511 of the destination application B.

A case in which the game of the destination application B is played will be described below with reference to FIG. 3. Herein, the user device 10 performs a game use process (step S2-1). Specifically, the user plays the game by use of the game view of the application B output on the display of the user device 10.

In this case, the game server 30 of the application B performs a game progress management process (step S2-2). Specifically, the game server 30 of the application B manages a progress of the game in the user device 10.

The game server 30 of the application B then performs a determining process as to whether the mission is completed (step S2-3). Specifically, the game server 30 of the application B compares the mission and the completion conditions recorded in the storage section for promotion information 32 with the game progress state of the user. When the game progress state of the user meets the completion conditions and the mission is completed, the game server 30 of the application B determines that the mission is completed.

When the game progress state of the user does not meet the completion conditions, the mission is not completed, or neither, the game server 30 of the application B determines that the mission has not been completed ("NO" in step S2-3). In this case, the game server 30 of the application B continues the game progress management process (step S2-2).

In contrast, when determining that the mission is completed ("YES" in step S2-3), the game server 30 of the application B performs a mission completion notifying process (step S2-4). Specifically, the game server 30 transmits a mission completion notification to the management server 20. The mission completion notification includes data on the campaign ID, the mission ID, and the user ID.

The controller 21 then performs a mission completion management process (step S2-5). Specifically, the mission management section 214 in the controller 21 records the mission completion state in the storage section for completion state information 25 based on the mission completion notification acquired from the game server 30. The process will be described below with reference to FIG. 5. The mission management section 214 returns a mission completion process result to the game server 30.

The game server 30 of the application B then performs a mission completion result notifying process (step S2-6). Specifically, the game server 30 of the application B transfers the mission completion process result from the management server 20 to the user device 10 of the logged-in user.

The user device 10 then performs a mission completion result output process (step S2-7). Specifically, the user device 10 outputs a mission completion result on the display. In this case, as illustrated in FIG. 4(c), mission completion display 521 is output to a destination application view 520.

Thereafter, the user device 10 performs a process of selecting the source application A while logging in the management server 20 (step S3-1). Specifically, the user device 10 accesses the game server 30 of the application A.

In this case, the game server 30 of the application A performs a mission completion checking link displaying process (step S3-2). Specifically, the game server 30 of the application A includes the mission completion checking link in the game view, and transmits the game view to the user device 10. The mission completion checking link includes data on the campaign ID associated with the application A. In this case, as illustrated in FIG. 4(d), a mission completion checking link 531 is output to a source application view 530 on the display of the user device 10.

The user device 10 then performs a mission completion checking link selecting process (step S3-3). Specifically, the user of the user device 10 selects the mission completion checking link to check the mission completion state. In this case, the user device 10 transmits a mission completion checking request to the management server 20.

The game server 30 of the application A then performs a mission completion checking process (step S3-4). Specifically, the game server 30 of the application A transmits a mission completion checking request to the management server 20. The mission completion checking request includes data on the campaign ID recorded in the storage section for promotion information 32 and the user ID of the logged-in user.

The controller 21 then performs a completion state information providing process (step S3-5). Specifically, the mission management section 214 extracts or reads the completion management information associated with the campaign ID and the user ID included in the mission completion checking request from the storage section for completion state information 25. The mission management section 214 then identifies the mission ID of the completed mission by use of the extracted completion management information. The mission management section 214 includes the identified mission ID in the mission completion state, and transmits the mission completion state to the game server 30 of the application A.

The game server 30 of the application A then performs an incentive giving process (step S3-6). Specifically, the game server 30 of the application A determines an incentive depending on the mission ID included in the mission completion state by use of the storage section for promotion information 32. When the completion conditions of the promotion management information are met, the game server 30 gives an incentive to the logged-in user. Further, the game server 30 transmits an incentive giving result to the user device 10. Thereby, the incentive is provided according to the completion state information of the user who has selected the campaign banner.

The user device 10 then performs a result output process (step S3-7). Specifically, the user device 10 outputs an incentive giving result on the display. In this case, as illustrated in FIG. 4(e), incentive acquisition display 541 is output on a source application view 540 on the display of the user device 10. Herein, a message indicating that the user has acquired an item as an incentive of the game is output on the incentive acquisition display 541.

Figure 5:
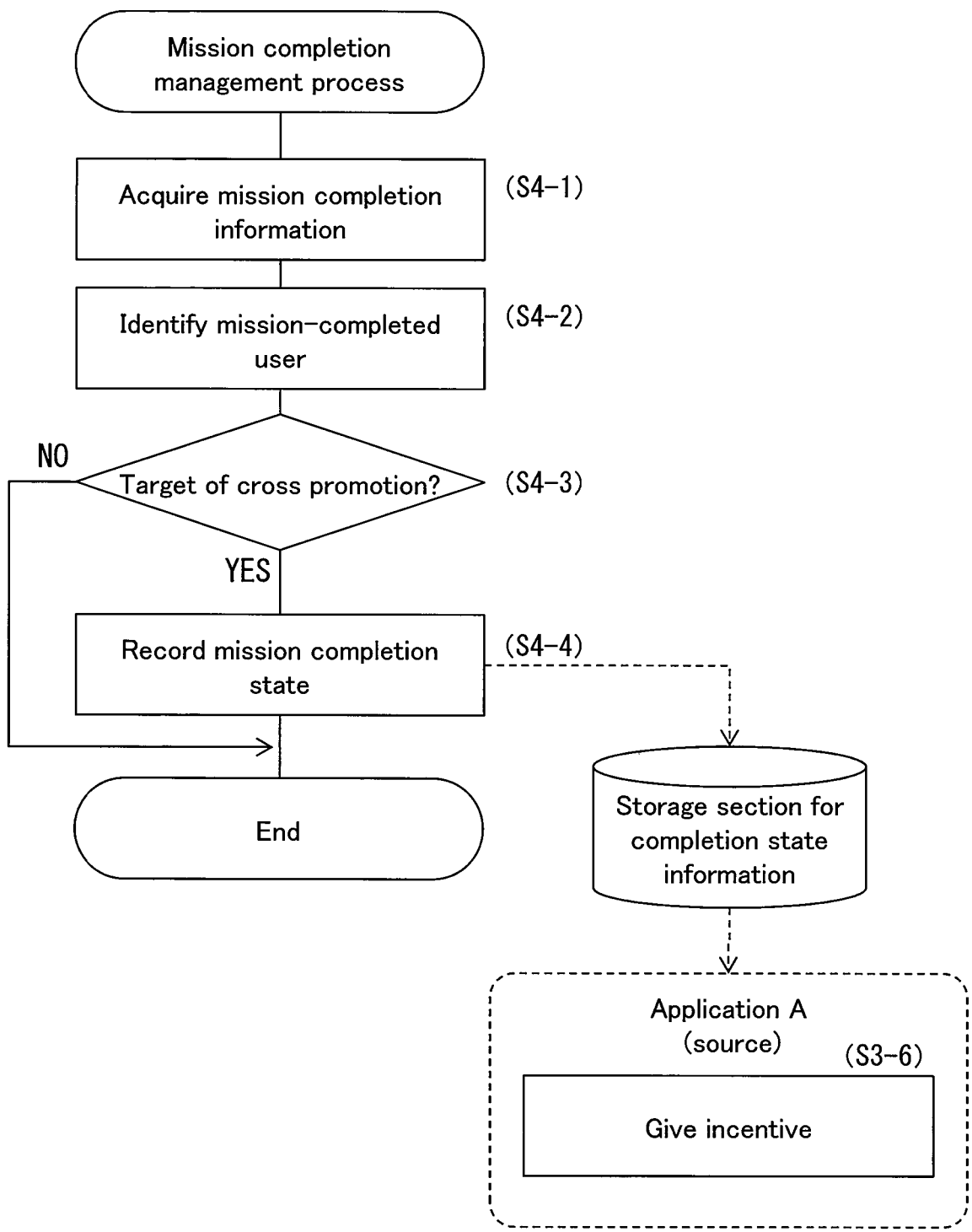
FIG. 5 is an explanatory diagram of a procedure in the system of FIG. 1.

A mission completion management process will be described below with reference to FIG. 5. At first, the controller 21 performs a completion information acquiring process (step S4-1). Specifically, the mission management section 214 acquires a mission completion notification from the game server 30 (the game server 30 of the application B, herein).

The controller 21 then performs a mission-completed user identifying process (step S4-2). Specifically, the mission management section 214 identifies a mission-completed user by use of the user ID included in the mission completion notification.

The controller 21 then performs a determining process as to whether the identified mission-completed user is a target of cross promotion (step S4-3). Specifically, the mission management section 214 checks whether the storage section for participation information 24 stores the participation state management information recording the user ID of the mission completion notification and the game ID of the destination. If the storage section for participation information 24 stores the participation state management information recording the user ID of the mission completion notification and the game ID of the destination, the controller 21 determines that the identified mission-completed user is a target of cross promotion.

If the controller 21 determines that the participation state management information recording the user ID of the mission completion notification and the game ID of the destination is not registered and the identified mission-completed user is not a target of cross promotion ("NO" in step S4-3), the mission completion management process ends.

In contrast, if the controller 21 determines that the participation state management information recording the user ID of the mission completion notification and the game ID of the destination is registered and the identified mission-completed user is a target of cross promotion ("YES" in step S4-3), the controller 21 performs a completion state recording process (step S4-4). Specifically, the mission management section 214 generates the completion management information including the user ID, the campaign ID, and the mission ID, and records the completion management information in the storage section for completion state information 25.

Figure 3:
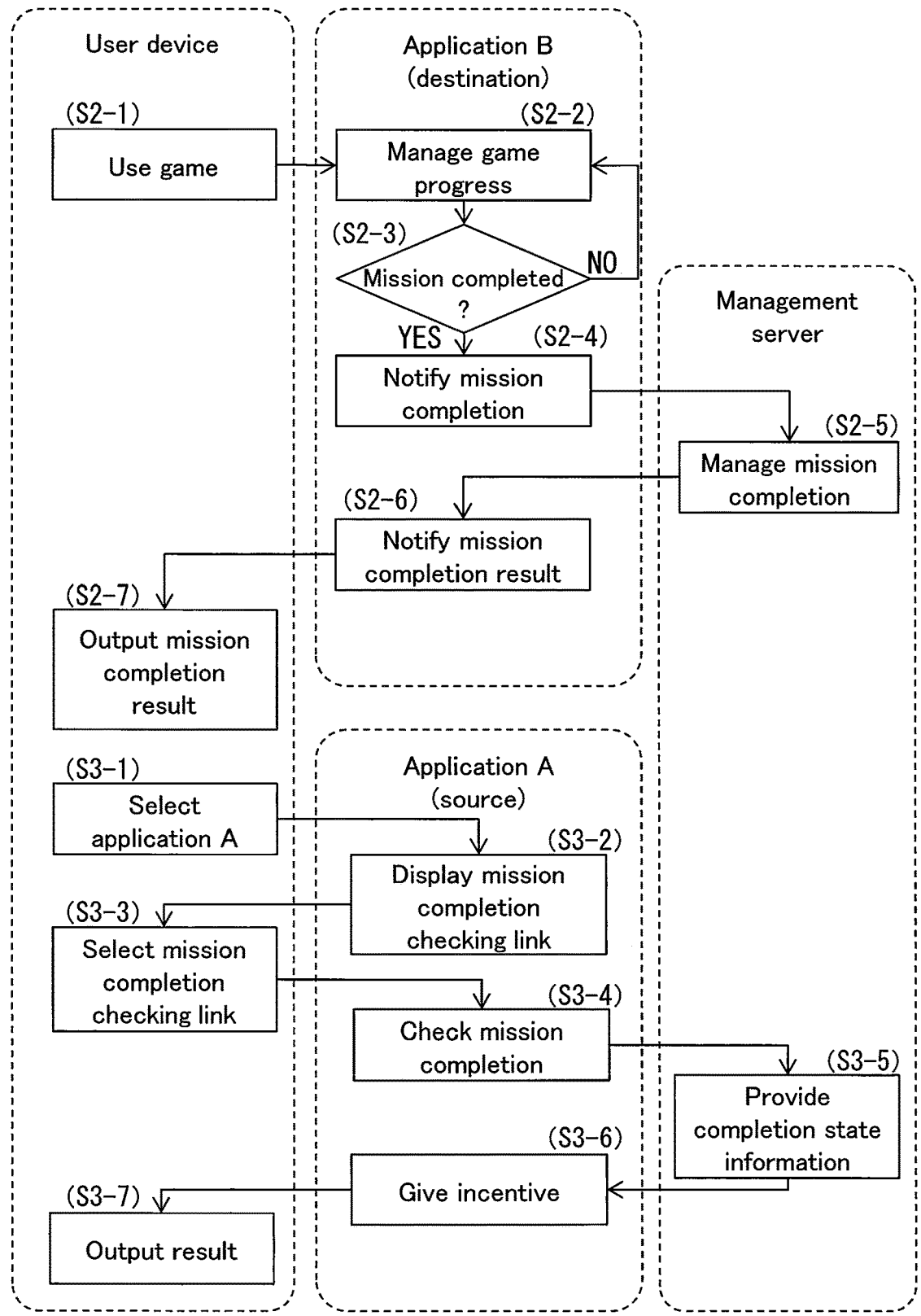
FIG. 3 is an explanatory diagram of a process procedure in the system of FIG. 1.
Figure 4:
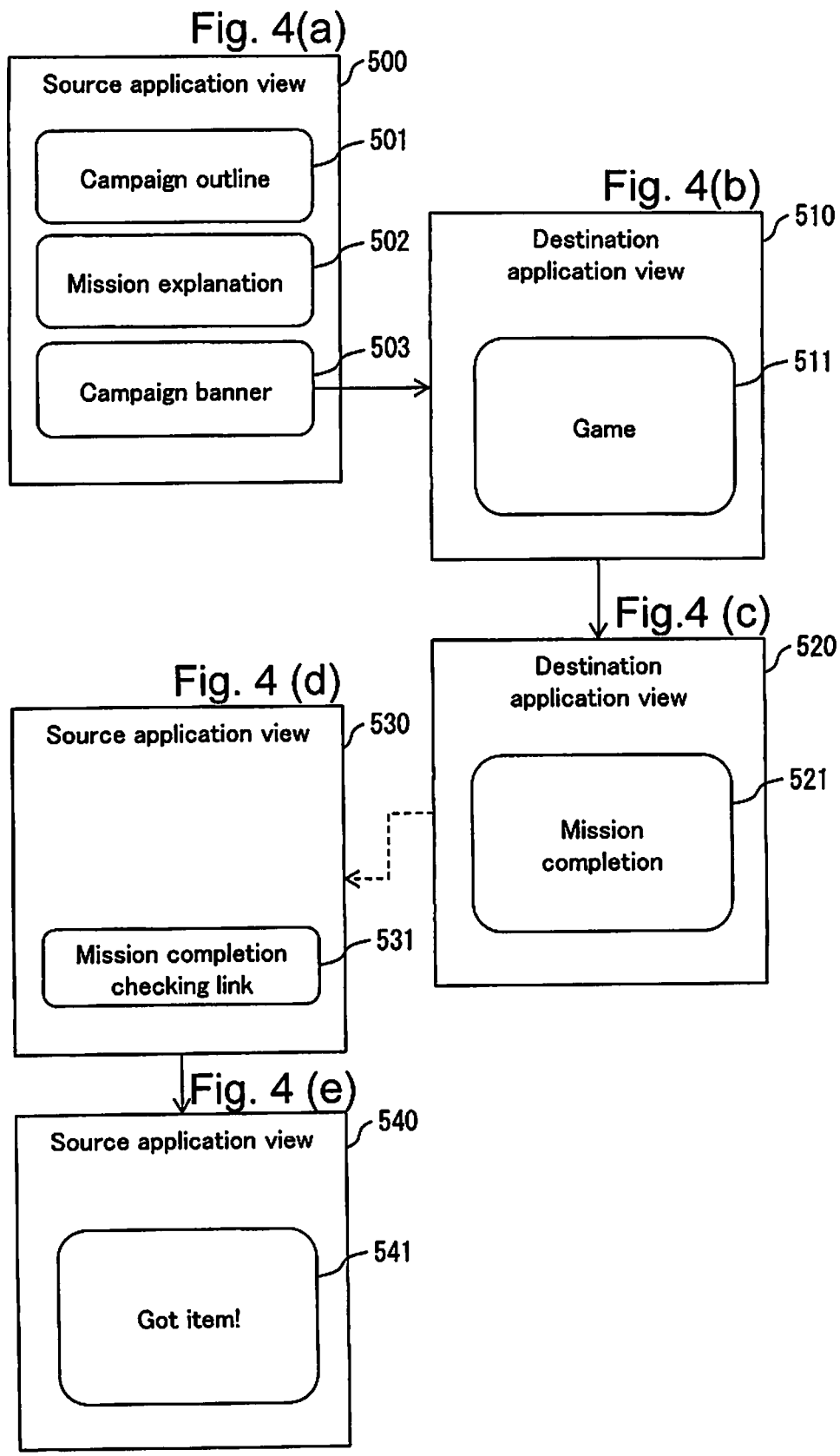
FIGS. 4(a) to 4(e) are explanatory diagrams of exemplary views in the system of FIG. 1, where

The game server 30 at the source performs the incentive giving process as illustrated in FIG. 3 (step S3-6).

The following advantages may be achieved according to the above embodiment:

(1) The management server 20 is used as a platform for managing the user of the user device 10, which uses a plurality of applications. The management server 20 comprises the controller 21, the storage section for user information 22, the storage section for campaign information 23, the storage section for participation information 24, and the storage section for completion state information 25. The storage section for campaign information 23 in the platform is capable of grasping how each user participates in a campaign for a plurality of applications. The storage section for completion state information 25 in the platform is capable of grasping a completion state of the mission set in the destination application for each source application. Thus, even if the application providers are different between the destination and the source, cross promotion can be performed between the applications, thereby promoting total vitalization of application use by users.

(2) The controller 21 performs the determining process as to whether the user of the user device 10 is qualified to participate in a campaign (step S1-4). When determining that the user of the user device 10 is qualified to participate in a campaign ("YES" in step S1-4), the controller 21 performs the campaign notifying process (step S1-9). The game server 30 of the application A performs the campaign banner generating process (step S1-10). Thereby, cross promotion for introducing another application can be performed in a specific application. When the user of the user device 10 selects a campaign banner, the controller 21 performs the participation registering process (step S1-14). This allows the storage section for participation information 24 to grasp a client guiding state in the cross promotion.

(3) When the user of the user device 10 selects a campaign banner, the controller 21 performs the destination information transmitting process (step S1-13). The user device 10 performs the redirecting process (step S1-15). This allows the user to be guided to the game server 30 of another application from a specific application.

(4) The game server 30 of the application B performs the determining process as to whether the mission has been completed (step S2-3). When determining that the mission has been completed ("YES" in step S2-3), the game server 30 of the application B performs the mission completion notifying process (step S2-4). The controller 21 performs the mission completion management process (step S2-5). Thereby, the mission completion state in cross promotion can be grasped. When the user device 10 performs a process for selecting the completion checking link (step S3-3), the game server 30 of the application A performs the mission completion checking process (step S3-4). The controller 21 performs the completion state information providing process (step S3-5). This allows each source to provide an incentive depending on the mission completion state to the user.

(5) The controller 21 performs the determining process as to whether the user of the user device 10 is qualified to participate in the campaign (step S1-4). When a destination application is registered as a currently-used game in the user management information and is being used, the controller 21 determines that the user of the user device 10 is not qualified to participate in the campaign. When the promotion effect for the user cannot be expected, the campaign provision can be restricted.

The above described embodiment may be modified as follows. The above embodiment has been described assuming that each application is a game in cross promotion using applications. However, an application to be subjected to cross promotion, or an application to be selected as a transmission source or transmission destination of the cross promotion is not limited to games, and various applications may be used therefor. The kind of a source application may be different from the kind of a destination application. The cross promotion may be performed by use of a plurality of applications provided in the platform.

The game server 30 of the application B performs the determining process as to whether the mission has been completed according to the above embodiment (step S2-3). The determination may be made by the management server 20. In this case, the management server 20 acquires the progress information of the application B from the game server 30. The mission management section 214 compares the progress information with the campaign management information recorded in the storage section for campaign information 23 and the mission management information, and determines whether the mission has been completed. When determining that the mission has been completed, the mission management section 214 records the completion management information in the storage section for completion state information 25.

Cross promotion for guiding clients from the application A to the application B is assumed in the above embodiment. The cross promotion may be alternately performed by the application A and the application B. In this case, the storage section for campaign information 23 records the campaign management information related to the client guiding from the application B to the application A in association with the client guiding from the application A to the application B. Thereby, cross use between a plurality of applications is promoted for the users using each application.

Cross promotion for guiding clients from the application A to the application B is assumed in the above embodiment. That is, the application A is the transmission source and the application B is the transmission destination. Herein, the management server 20 may specify an application for cross promotion. In this case, the management server 20 compares the number of users (UA) who use the application A but do not use the application B with the number of users (UB) who use the application B but do not use the application A. The management server 20 changes the incentive based on a comparison result. For example, the management server 20 provides a higher incentive to the application with fewer users. For example, when UA is lower than UB, the management server 20 provides a higher incentive to the application B. Thereby, guiding clients to another application and returning to the source application can be promoted.

Figure 6A:
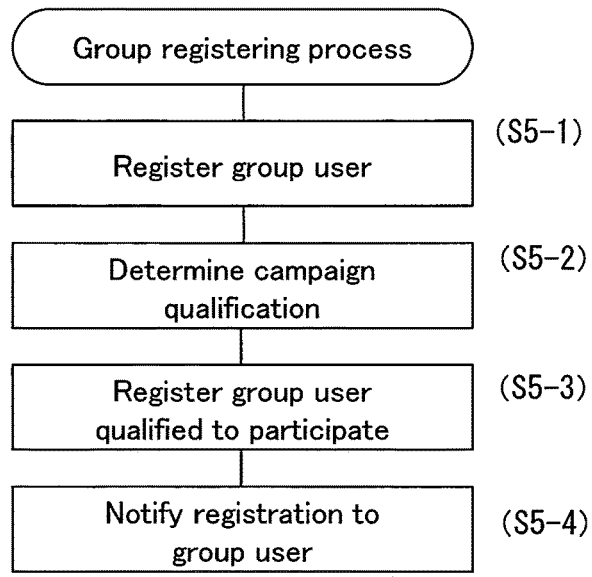
FIG. 6A is an explanatory diagram of a group registering process in a system according to another embodiment.

In the above embodiment, promotion of guiding one user from a source application to a destination application is performed. Instead, promotion may be performed for a plurality of users (group users). In this case, the management server 20 performs a group registering process and a mission completion management process. A group registering process will now be described with reference to FIG. 6A. When acquiring the campaign selection notification from the user device 10, the controller 21 performs a group user registering process (step S5-1). Specifically, the campaign management section 212 outputs a group registration view on the display of the user device 10. The user (logged-in user) of the user device 10 designates a user who is a friend or peer of the logged-in user and is registered in the storage section for user information 22 on the group registration view. The campaign management section 212 acquires the user ID of the group user designated on the group registration view from the user device 10.

The controller 21 then performs a participation qualification determining process (step S5-2). Specifically, the campaign management section 212 acquires the user management information from the storage section for user information 22 based on the user ID of the group user. The campaign management section 212 checks a currently-used game in the user management information of each user belonging to the designated group users by use of the storage section for user information 22. Herein, a user for which the source application is registered for use and the destination application is not registered for use is determined as being qualified to participate in the campaign.

The controller 21 then performs a process of registering a group user who is qualified to participate (step S5-3). Specifically, the campaign management section 212 registers the user ID of each user in the group users qualified to participate in the campaign in the storage section for participation information 24 in association with the user ID of the logged-in user. Thereby, the user is registered in the group as a group user of the logged-in user.

The controller 21 then performs a process of notifying the group users of registration (step S5-4). Specifically, the campaign management section 212 transmits a participation request to the user device 10 of each user in the group users.

Figure 6B:
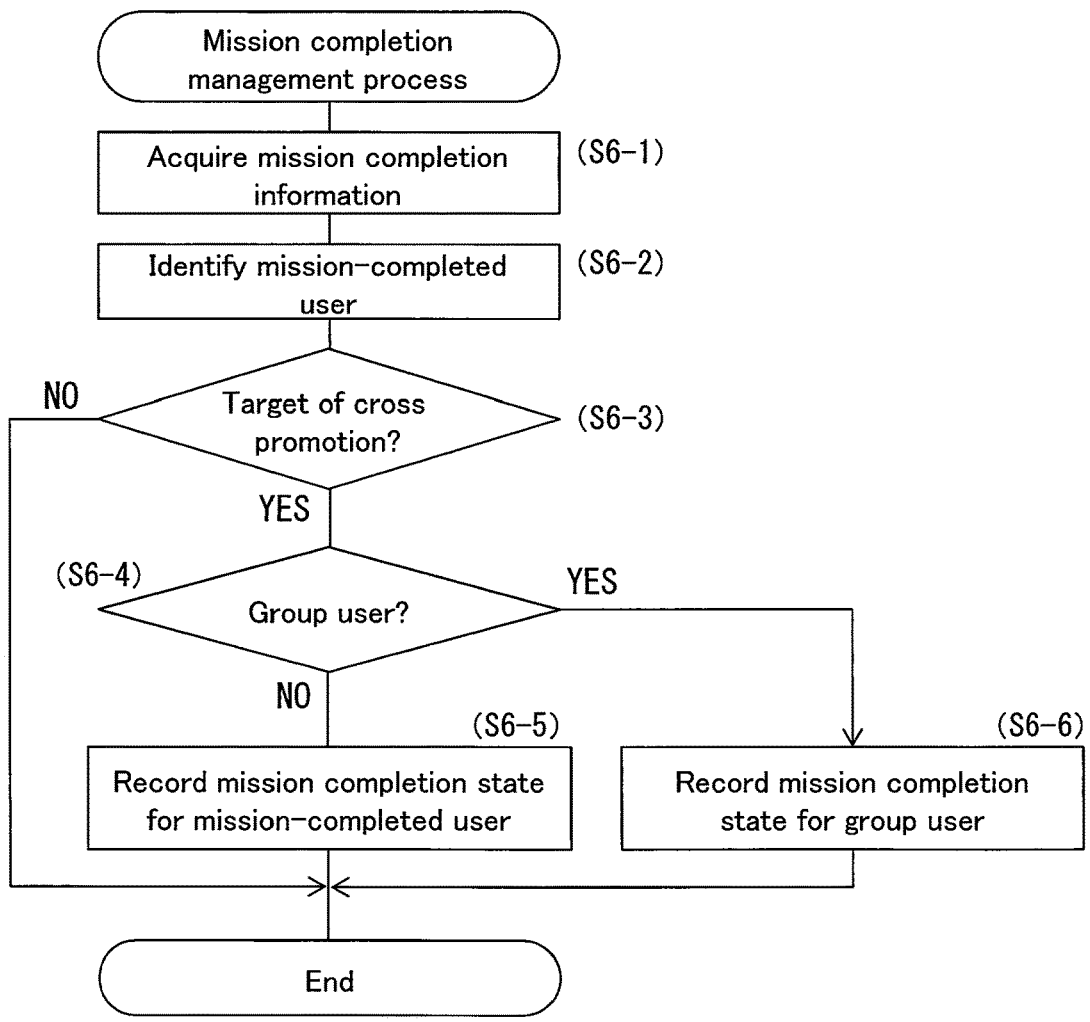
FIG. 6B is an explanatory diagram of a mission completion management process in a system according to another embodiment.

A mission completion management process in a group will now be described with reference to FIG. 6B. At first, the controller 21 performs the completion information acquiring process similarly as in step S4-1 (step S6-1).

The controller 21 then performs the mission-completed user identifying process (step S6-2) and the determining process (step S6-3) as to whether the identified mission-completed user is a target of cross promotion similarly as in steps S4-2 and S4-3, respectively.

When the controller 21 determines that the identified mission-completed user is not a target of cross promotion ("NO" in step S6-3), the mission completion management process ends.

In contrast, when determining that the identified mission-completed user is a target of cross promotion ("YES" in step S6-3), the controller 21 performs a determining process as to whether the user is a group user (step S6-4). Specifically, the mission management section 214 checks whether the user ID of the user is registered in the group in the storage section for participation information 24. When the user ID is registered in the group in association with other user IDs, the user is determined as a group user.

When the user ID of the user is solely registered and thus the user is not determined as a group user ("NO" in step S6-4), the controller 21 performs a completion state recording process on the mission-completed user (step S6-5). Specifically, the mission management section 214 generates completion management information including the user ID, the campaign ID, and the mission ID and records the completion management information in the storage section for completion state information 25.

In contrast, when determining that the user is a group user ("YES" in step S6-4), the controller 21 performs a mission completion state recording process on the group user (step S6-6). Specifically, the mission management section 214 extracts other user IDs registered in the group in association with the user ID of the logged-in user in the storage section for participation information 24. The mission management section 214 generates completion management information including the campaign ID and the mission ID in association with all the user IDs of the logged-in user and the group users, and records the completion management information in the storage section for completion state information 25.

Thereby, the mission can be completed by the group including a plurality of users. Cross promotion can be performed on the users belonging to the group. Thereby, the users can be promoted to be guided collectively.

In the above embodiment, the controller 21 performs the determining process as to whether a user is qualified to participate in the campaign (step S1-4). Herein, the number of participants in the campaign may be restricted. In this case, data on the number of possible participants is recorded in the storage section for campaign information 23. The controller 21 performs a banner output determining process.

Figure 7:
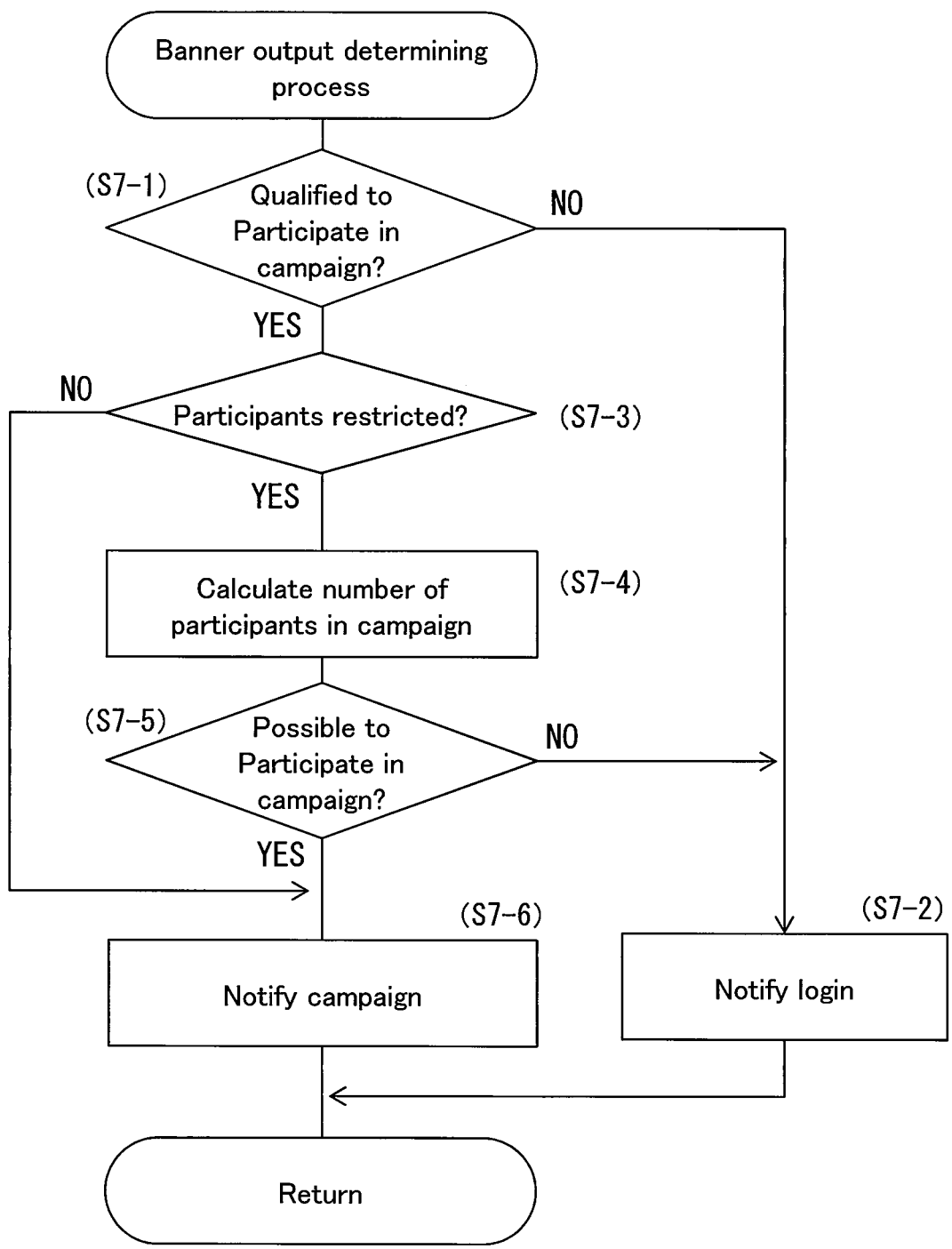
FIG. 7 is an explanatory diagram of a procedure in a system according to another embodiment.

A banner output determining process will now be described with reference to FIG. 7. Herein, at first, the controller 21 performs the determining process as to whether the user of the user device 10 is qualified to participate in the campaign similarly as in step S1-4 (step S7-1).

When determining that the user of the user device 10 is not qualified to participate in the campaign ("NO" in step S7-1), the controller 21 performs the login notifying process similarly as in step S1-5 (step S7-2).

In contrast, when determining that the user of the user device 10 is qualified to participate in the campaign ("YES" in step S7-1), the controller 21 performs a determining process as to whether the number of participants for cross promotion is restricted (step S7-3). Specifically, the mission management section 214 checks whether the storage section for campaign information 23 stores the number of possible participants associated with the campaign ID. When the storage section for campaign information 23 stores the number of possible participants associated with the campaign ID, it is determined that the number of participants is restricted.

When determining that the number of participants for cross promotion is restricted ("YES" in step S7-3), the controller 21 performs a process of calculating the number of participants in the campaign (step S7-4). Specifically, the campaign management section 212 counts the user IDs stored in the storage section for participation information 24 in association with the campaign ID of the cross promotion thereby to calculate the number of participants in the cross promotion.

The controller 21 then performs a determining process as to whether a user can participate in the campaign (step S7-5). Specifically, the campaign management section 212 compares the calculated number of participants with the number of possible participants. When the number of participants is equal to or lower than the number of possible participants, the campaign management section 212 determines that the users who want to participate can participate in the campaign.

When determining that the number of participants exceeds the number of possible participants and the users who want to participate cannot participate in the campaign ("NO" in step S7-5), the controller 21 performs the login notifying process (step S7-2).

In contrast, when determining that the number of participants is equal to or lower than the number of possible participants and thus the users who want to participate can participate in the campaign ("YES" in step S7-5), the controller 21 performs the campaign notifying process similarly as in step S1-9 (step S7-6). In this case, the campaign management section 212 includes data on the number of remaining possible participants, which is the difference between the number of possible participants and the number of participants in the campaign notification.

Also, when the number of possible participants is not recorded and thus it is determined that the number of participants in the cross promotion is not restricted ("NO" in step S7-3), the controller 21 performs the campaign notifying process (step S7-6).

Figure 2:
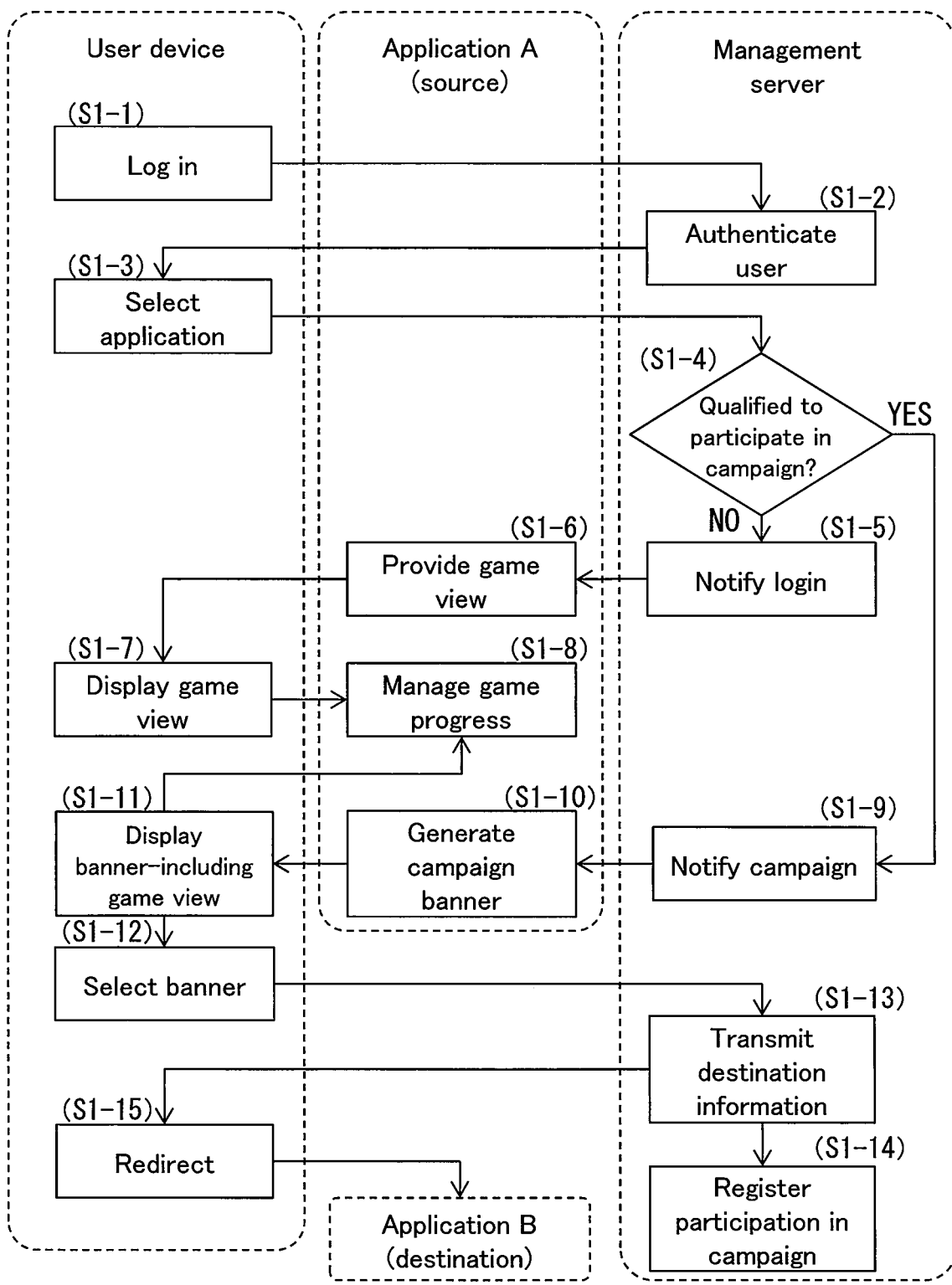
FIG. 2 is an explanatory diagram of a process procedure in the system of FIG. 1.

As illustrated in FIG. 2, the game server 30 of the application A performs the campaign banner generating process (step S1-10). Herein, the campaign banner includes the information on the number of remaining possible participants.

Thereby, the number of participants in the campaign can be restricted. Further, the number of remaining possible participants is displayed in the campaign banner thereby to promote quick participation in the campaign.

The invention claimed is:

1. A method performed by a server for managing a plurality of applications including a first application and a second application, the method comprising:

in response to the first application being selected in a first user device of a first user, controlling the first user device to output a link related to the second application associated with the first application;

guiding the first user device to the second application, when the link is selected in the first user device;

acquiring completion state information on a mission from the second application, the mission being performed by the first user of the first user device on the second application in response to the link being selected in the first user device, and the completion state information being associated with a user ID of the first user;

storing the completion state information;

receiving a request for checking completion state on the mission from the first application;

providing to the first application the completion state information on the mission performed in the second application in response to the link being selected in the first user device, which is acquired by the acquiring from the second application, when the completion state information meets a predetermined condition, so that the first application provides an incentive in the first application to the first user as a result of the first user selecting the link and performing the mission in the second application;

storing information of a currently-used game in association with the user ID;

checking whether the second application is registered or not based on the information of the currently-used game in association with the user ID, when the first application is selected in the first user device;

controlling the first user device to output the link to the first user device when the first user device is not using the second application;

storing the user ID as a participant, when the link is selected in the first user device; and acquiring, from the second application, completion state information for the user ID of the participant.

2. The method according to claim 1, further comprising:

storing a user group associated with user IDs of a plurality of participants, and storing completion state information for each of the plurality of participants, based on use state information of each user belonging to the user group.

3. The method according to claim 1, further comprising:

managing a first number of users which use a first application and do not use a second application and a second number of users which use the second application and do not use the first application;

setting one application with fewer users as the first application and other application as the second application, among the first application and the second application, based on a comparison of the first number and the second number; and providing a higher incentive on the first application with fewer users.

4. The method according to claim 2, further comprising:

updating the completion state information as a group, for the plurality of participants belonging to the user group, when the completion state information related to at least one of the plurality of participants meets the predetermined condition.

5. A server for managing a plurality of applications including a first application and a second application, the server comprising:

circuitry configured to store information associating the first application with the second application and completion state information on at least one mission associated with user IDs of participants;

in response to the first application being selected in a first user device of a first user, control the first user device connected to the server via a network, to output a link related to the second application associated with the first application;

guide the first user device to the second application, when the link is selected in the first user device;

acquire completion state information on a mission from the second application, the mission being performed by the first user of the first user device on the second application in response to the link being selected in the first user device, and the completion state information being associated with the user ID of the first user;

store the completion state information;

receive a request for checking completion state on the mission from the first application; and provide to the first application the completion state information on the mission performed in the second application in response to the link being selected in the first user device, which is acquired by the circuitry from the second application, when the completion state information meets a predetermined condition, so that the first application provides an incentive in the first application to the first user as a result of the first user selecting the link and performing the mission in the second application;

wherein the circuitry is configured to store information of a currently-used game in association with the user ID, wherein the circuitry is configured to check whether the second application is registered or not based on the information of the currently-used game in association with the user ID, when the first application is selected in the first user device, wherein the circuitry is configured to control the first user device to output the link to the first user device when the first user device is not using the second application, wherein the circuitry is configured to store the user ID as a participant, when the link is selected in the first user device, and wherein the circuitry is configured to acquire, from the second application, completion state information for the user ID of the participant.

6. The server according to claim 5, wherein the circuitry is configured to store a user group associated with user IDs of a plurality of participants, and wherein the circuitry is configured to store completion state information for each of the plurality of participants, based on use state information of each user belonging to the user group.

7. The server according to claim 5, wherein the circuitry is configured to manage a first number of users which use a first application and do not use a second application and a second number of users which use the second application and do not use the first application, wherein the circuitry is configured to set one application with fewer users as the first application and other application as the second application, among the first application and the second application, based on a comparison of the first number and the second number, and wherein the circuitry is configured to provide a higher incentive on the first application with fewer users.

8. The server according to claim 6, wherein the circuitry is configured to update the completion state information as a group, for the plurality of participants belonging to the user group, when the completion state information related to at least one of the plurality of participants meets the predetermined condition.

9. A non-transitory computer readable medium, including computer-program instructions, which when executed by a server for managing a plurality of applications including a first application and a second application, cause the server to:
- store information associating the first application and the second application and completion state information on at least one mission in association with user IDs of participants;
- in response to the first application being selected in a first user device of a first user, control the first user device connected to the server via a network, to output an link related to the second application associated with the first application;
- guide the first user device to the second application when the link is selected in the first user device;
- acquire completion state information on a mission from the second application, the mission being performed by the first user of the first user device on the second application in response to the link being selected in the first user device, and the completion state information being associated with a user ID of the first user;
- store the completion state information;
- receive a request for checking completion state on the mission from the first application; and
- provide to the first application the completion state information on the mission performed in the second application in response to the link being selected in the first user device, which is acquired from the second application, when the completion state information meets a predetermined condition, so that the first application provides an incentive in the first application to the first user as a result of the first user selecting the link and performing the mission in the second application;
- store a currently-used game in association with the user ID;
- check whether the second application is registered or not based on the information of the currently-used game in association with the user ID, when the first application is selected in the first user device; and
- control the first user device to output the link to the first user device when the first user device is not using the second application;
- store the user ID as a participant, when the link is selected in the first user device; and
- acquire, from the second application, completion state information for the user ID of the participant.

10. The non-transitory computer readable medium according to claim 9, wherein the computer-program instructions, when executed by the server, cause the server to:
- store a user group associated with user IDs of a plurality of participants; and
- store completion state information for each of the plurality of participants, based on use state information of each user belonging to the user group.

11. The non-transitory computer readable medium according to claim 9, wherein the computer-program instructions, when executed by the server, cause the server to:
- manage a first number of users which use a first application and do not use a second application and a second number of users which use the second application and do not use the first application;
- set one application with fewer users as the first application and other application as the second application, among the first application and the second application, based on a comparison of the first number and the second number; and
- provide a higher incentive on the first application with fewer users.

12. The non-transitory computer readable medium according to claim 10, wherein the computer-program instructions, when executed by the server, cause the server to:
- update the completion state information as a group, for the plurality of participants belonging to the user group, when the completion state information related to at least one of the plurality of participants meets the predetermined condition.

13. A non-transitory computer readable medium, including computer-program instructions, which when executed by a first user device connected with a server for managing a plurality of applications including a first application and a second application, cause the first user device to:
- select the first application;
- output a link related to the second application associated with the first application, in response to determination by the server that a first user of the first user device meets a condition of participation based on a user ID of the first user;
- implement a mission on the second application, in response to redirection by the server from the first application to the second application, when the first user device selects the link;
- transmit, on the first application, a request for checking completion state on the mission to the server;
- output, on the first application, a result of acquiring incentive in the first application, in response to completion state information on the mission performed in the second application from the server, when the completion state information meets a predetermined condition, the incentive in the first application being provided by the first application as a result of the first user selecting the link and performing the mission in the second application and the completion state information on the mission performed on the second application being associated with the user ID of the first user; and
- output the link when the second application is not being used, wherein the server is configured to:
- store information of a currently-used game in association with the user ID;
- check whether the second application is registered or not based on the information of the currently-used game in association with the user ID, when the first application is selected;
- store the user ID as a participant, when the link is selected; and
- acquire, from the second application, completion state information for the user ID of the participant.

* * * * *